Figure 1:
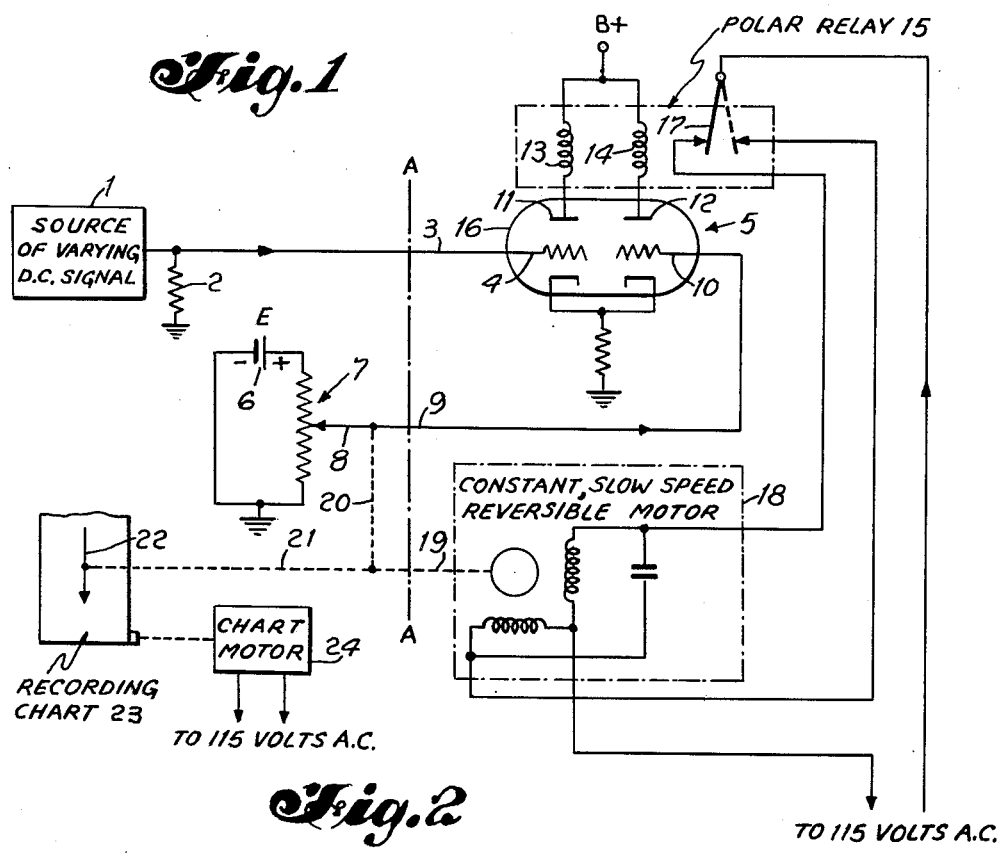

Nov. 27, 1962 R. T. ADAMS ETAL 3,066,297
MEDIAN VALUE DATA RECORDER
Filed Jan. 14, 1960

INVENTORS.
ROBERT T. ADAMS
BY JACK B. HARVEY

Alfred C. Hill
AGENT

United States Patent Office 3,066,297
Patented Nov. 27, 1962

3,066,297
MEDIAN VALUE DATA RECORDER
Robert T. Adams, Short Hills, and Jack B. Harvey, Clifton, N.J., assignors to International Telephone and Telegraph Corporation, Nutley, N.J., a corporation of Maryland
Filed Jan. 14, 1960, Ser. No. 2,378
18 Claims. (Cl. 346—32)

This invention relates to data recorders and more particularly to an improved data recorder for determining and recording the median value of a varying voltage which may advantageously be employed to determine the propagation characteristics of the signal propagation path in a radio transmission system of the scatter type.

The term "median value" as employed in the specification and claims herein has reference to that average amplitude during a specified period of time which is exceeded by the signal amplitude 50% of the specified period and which exceeds the signal amplitude 50% of the specified period.

It is well known that knowledge of the median value of carrier signal received after propagation over a given path is very important in the planning of a scatter type transmission system, particularly of the tropospheric type, for use over the given path. The median value of randomly varying signals is very important in a mathematical and statistical analysis of the propagated signal. If the median value is obtained during the period of worst signal propagation, namely, the colder months, an accurate design specification for a transmission system having a certain reliability to operate over the given path may be prepared. Two measuring techniques have been previously employed to obtain the median value of a varying voltage. The first technique employs a totalizer and is accurate if the quantizing lever is well chosen. This technique is expensive, inconvenient to calibrate, and difficult to read, particularly if hourly medians are desired. Moreover this method does not give a true median value, as interpretation of the recorded data must be obtained, before the true median value can be ascertained. The second technique consists of recording either the AGC (automatic gain control) voltage or the logarithm of the input signal voltage. The technique avoids the problem of the first technique to some extent, but at a large cost in accuracy if operated slowly or the disadvantage of maintaining an ink supply, paper changing, pen friction and visual evaluation of the recorded information if a complete record is made to determine the actual median value. The equipment employed to carry out each of these techniques incorporate circuits having a long time constant operating directly on the signal being recorded. The long time constant circuits of the above equipment are a source of two errors due to their filtering action which causes circuit to indicate mean rather than median value. The two errors result in an indication of a median value different from the actual median value. The first error is due to the asymmetry of the signal waveform to be recorded resulting from the action of the AGC circuit in the signal receiver which produces an output signal logarithmically related to the input signal normally subjected to Rayleigh fading. The second error results when the signal amplitude approaches the receiver threshold and threshold clipping occurs.

An object of this invention is to provide an improved median value data recorder overcoming at least the above-mentioned disadvantages of the previous measuring techniques.

Another object of this invention is the provision of a median value data recorder to determine and record the exact median value of a varying voltage for a given period of time, responding to the times when the amplitude of the signal being analyzed is above or below a reference amplitude and not to the amplitude of the voltage being analyzed or any function thereof.

A feature of this invention is the provision of a source of reference voltage and a comparison means responsive to a voltage varying in accordance with input signal variations and the reference voltage to produce a control voltage indicative of the relative amplitudes of the input signal and the reference voltage, that is, which of these two signals is greater in magnitude, not the difference in magnitude between the two signals. An arrangement responds to the control voltage to reduce the magnitude of the difference between the reference voltage and the varying voltage to obtain the median value of the input signal. The arrangement responding to the control voltage may operate either on the reference voltage or varying voltage to reduce the magnitude of the difference therebetween.

Another feature of this invention is the provision of a constant speed, reversible motor rotated in one direction or the other in response to the relative amplitudes of the varying voltage representing the input signal and the reference voltage to slowly adjust the amplitude of either the varying voltage or the reference voltage to reduce the magnitude of the difference therebetween to obtain the median value of the input signal. A recording pen is driven by the motor to record the median value of the input signal. The speed of the motor is so slow that the motor will not follow fast fluctuations of the varying voltage and thereby integrate to indicate the median value of the varying voltage. Speed of motor may be chosen to average longer or shorter intervals of data.

Figure 2:
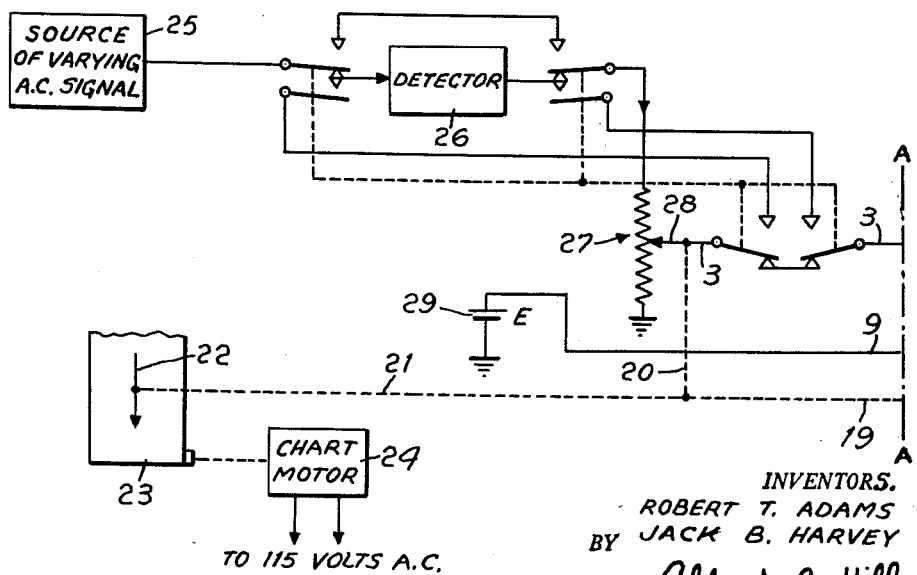

The above-mentioned and other features and objects of this invention will become more apparent by reference to the following description taken in conjunction with the accompanying drawings, in which:

FIG. 1 is a schematic diagram of a median value data recorder in accordance with the principles of this invention; and FIG. 2 is a schematic diagram of various circuit components which when substituted for those components of FIG. 1 to the left of line A—A illustrate two other embodiments of a median value data recorder following the principles of this invention.

Referring to FIG. 1, there is illustrated therein in schematic form an embodiment of the median value data recorder of this invention operating to determine and record the median value of a varying signal such as the signal from source 1. Source 1 may consist of a radio signal receiver including a detector therein, such as an AGC detector, to convert the radio frequency signal into a D.C. (direct current) signal varying in amplitude in accordance with the amplitude of the radio frequency signal.

The signal of source 1 develops a voltage varying in accordance therewith across resistor 2. The varying voltage is coupled by conductor 3 to grid 4 of differential amplifier 5, one form the comparison means of this invention may assume.

In accordance with this invention the signal of source 1 represented by the varying voltage is compared against reference voltage to obtain the signal's median value. The reference voltage may be provided by a battery 6 having coupled in shunt relation thereto a potentiometer 7. The sliding contact 8 of potentiometer 7 is positioned to provide an amplitude of reference voltage for coupling along conductor 9 to control grid 10 of differential amplifier 5. The anodes 11 and 12 of differential amplifier 5 are respectively coupled to coils 13 and 14 of polar relay 15.

The operating condition of differential amplifier 5 is such that both halves of tube 16 are in a conducting condition with that half of tube 16 having the larger of the two voltages coupled to amplifier 5 applied to its grid conducting the heaviest. The coils 13 and 14 of relay 15 control the position of arm 17 depending upon which one of coils 13 and 14 has the largest current passing therethrough. The amount of current in coils 13 and 14 is dependent entirely upon the amount of conduction taking place in its associated half of tube 16. Relay 15 responds almost immediately to change the position of arm 17 from one contact to the other when the heavier conduction condition is transferred from one half of tube 16 to the other half of tube 16. It should be noted that polar relay 15 can assume only two positions. It is never in an "off" position and the pen recorder will always be moving in one direction or the other at constant speed, and therefore, the recorder never actually stops at the desired median value but will be above and then below the value resulting in "hunting."

To more specifically illustrate the operation of the median value data recorder, contact 8 of potentiometer 7 is positioned to provide an initial amplitude of reference voltage for coupling to grid 10 of tube 16. Let us assume that the amplitude of the signal of source 1 as represented by the varying voltage coupled to grid 4 of tube 16 is less than the initial reference voltage amplitude. Amplifier 5 under these conditions will produce a control voltage proportional to the relative amplitude of the varying voltage and reference voltage in the form of a heavier conduction in that half of tube 16 including grid 10 thereby causing coil 14 to control the position of arm 17 as indicated by the solid line representation. This will cause the constant, slow speed reversible motor 18 to rotate in the proper direction to change the position of contact 8 through mechanical linkages 19 and 20 to reduce the magnitude of the difference between the voltage on grid 4, the varying voltage, and the reference voltage to automatically correct the initial amplitude of reference voltage and, hence, the initial median value as established thereby. Motor 18 in connection with mechanical linkages 19 and 21 will cause pen 22 to move in step with contact 8 to record the change in refernce voltage from its initial value to its corrected value and, hence, the correction of the median value to obtain the exact median value of the signal of source 1. Pen 22 will record the change of the reference voltage level and the direction of the change on recording chart 23 which is driven in a well known manner by the chart motor 24. When the varying voltage in grid 4 exceeds the reference voltage on grid 10, the current will flow heavier through coil 13 than it will flow through coil 14 and thence, activate arm 17 of relay 15 to assume the dotted line position causing a reversal in the direction of rotation of motor 18 which will act to adjust the position of contact 8 of potentiometer 7 and, hence, the amplitude of the reference voltage to reduce the magnitude of the difference between the reference voltage and the input signal as represented by the varying voltage at grid 4.

It shoud be observed that the activation of motor 18 is not determined by the magnitude of the amplitude difference between the signal of source 1 represented by the varying voltage and the reference voltage but rather the sense of this difference, that is, whether the amplitude of the varying voltage is above or below the amplitude of the reference voltage. Hence, the difference voltage existing between the varying voltage and the reference voltage will vary in one direction or the other and this differential voltage depending upon its direction of variation will activate motor 18 to move in one direction or the other. The speed of motor 18 is so slow that the motor will not follow the fast fluctuations of the varying voltage and thereby integrate to indicate the median value of the varying voltage. The length of the interval over which the data is averaged is determined by the speed of the motor 18.

By moving contact 8 and, hence, pen 22 at a constant speed and by limiting the speed of travel of contact 8 and pen 22 an effect similar to a large time constant ahead of the recorder is obtained and, hence, acts to time integrate the sense of the differential voltage in order to bring the reference voltage to the median value of the signal of source 1.

As outlined hereinabove, and provided the speed of motor 18 is made sufficiently low and the action of the motor 18 is controlled by the sense of the difference voltage and not the magnitude of the difference voltage, the rate at which pen 22 moves to a new position will be unaffected by the error or difference between the varying signal and the original pen position. This provides a more nearly true representation of the median value and since the speed of motor 18 is the same in each direction of rotation, the effect of the different charging and discharging time constants of the previous measuring techniques is eliminated. The record recorded on chart 23 by pen 22 is a straight line having a constant slope, at times rising and at other times falling, representing the median value of the signal of source 1.

Referring to FIG. 2, there is illustrated therein certain components to be substituted for those components to the left of line A—A of FIG. 1 to form two alternative embodiments of the median value data recorder of this invention. The result embodiments operate in substantially the same manner as described hereinabove with the exception that the control voltage as obtained in differential amplifier 5 operates motor 18 to adjust the amplitude of a varying voltage proportional to the input signal to reduce the magnitude of the difference between the varying voltage and the reference voltage rather than adjusting the reference voltage relative to the varying voltage as described in connection with FIG. 1.

The embodiment provided by appropriately substituting the components of FIG. 2 for those components in FIG. 1 and leaving the switching arrangement as indicated in the drawing enables the determination and recording of a median value of a varying D.C. signal with the adjustable element of the median value recorder being in the varying voltage lead. The varying A.C. (alternating current) signal of source 25 is coupled to a detector 26 wherein the varying A.C. signal is converted to a D.C. signal varying in accordance with the variations of the signal of source 25. The detector 26 may be an envelope detector to obtain the envelope of a radio frequency signal. The source 25 and detector 26 may be components of source 1 of FIG. 1.

The varying D.C. output of detector 26 is coupled to a potentiometer 27 whose sliding contact 28 is adjusted to provide a varying voltage proportional to the output of detector 26 for coupling along conductor 3 to grid 4 of the differential amplifier 5. The position assumed by contact 28 and, hence, the amount of voltage coupled therefrom to amplifier 5 is the initial setting which proximates the median value of the signal and is taken as an initial level for comparison with a reference voltage. In the embodiments formed by the components of FIG. 2, the reference voltage may be provided by a battery 29 coupled by conductor 9 to grid 10 of the differential amplifier 5. Differential amplifier 5 operates in the same manner as described hereinabove in connection with FIG. 1 to control motor 18 in accordance with the sense of direction of the differential voltage, that is, the sense of direction of the difference between the varying voltage at contact 28 and the reference voltage of battery 29. Amplifier 5 develops the control voltage proportional to the sense of the differential voltage to activate motor 18 in the manner described hereinabove with respect to FIG. 1 to control the position of pen 22 to record the median level on chart 23 as described above with respect to FIG. 1. Simultaneously with the activation and movement of pen 22, motor 18 moves contact 28 by means of mechanical linkages 19 and 20 to reduce the magnitude of the difference between the reference voltage and the varying voltage proportional to the input-signal to thereby automatically correct the median value initially adopted to the exact median value of the signal being measured.

The second embodiment of FIG. 2 will be illustrated by moving the switching arrangement to the other position. This places potentiometer 27 between detector 26 and source 25. The operation is the same as described above but enables the determination of the median value of an alternating signal and also removes the effect of detector non-linearity. This is accomplished since detector 26 will make a decision as to when the motor reverses direction at a fixed operating point.

The embodiments provided by the components of FIG. 2 operate identically with the embodiment of FIG. 1 with the exception that the means responsive to the control voltage as determined by amplifier 5 operates upon a varying voltage proportional to the input signal in the case of the embodiment of FIG. 2 and on the reference voltage in the case of the embodiment of FIG. 1 to correct the amplitude of the voltage at either of these two points to indicate the median value.

With respect to the embodiments of both FIGS. 1 and 2, the response rate and hence, the operation of the data recorder is not dependent on the magnitude of the input signal. The sense of direction of the difference voltage between the input signal as represented by a varying voltage and a reference voltage determines the direction of rotation of motor 18 and, hence, the direction of travel or movement of pen 22. The action of the motor 18 as controlled by polar relay 15 and amplifier 5 and the speed at which motor 18 acts is to integrate those times that the varying voltage is above a reference voltage level and those times that the varying voltage is below the reference level. The difference between the resultant integrations is used to obtain the exact median value of the input signal.

The data recorder of this invention can be utilized to analyze an input voltage which changes slightly such as will be encountered for those signals received in a scatter link under normal conditions of propagation or when the input signal changes rapidly as periods when the rate of fading increases. In the former instance only the value of reference voltage and the speed of the motor need be considered. However, in the latter condition the dynamic characteristics of the relay and the motor must be considered. To enable the recorder of this invention to operate properly in the latter condition, relay 15 must be able to insure rapid clean switching and the motor should have a low inertia and almost instantaneous startings and stoppings. A Sigma Series 72 polar relay will provide the desired clean switching of up to five hundred operations per second and the A. W. Haden Series 24100 A.C. timing motor has the necessary low inertia and is capable of sufficiently fast startings and stoppings. Another solution to the motor problem would be to employ two opposite running clock motors having clutches which are applied to an output shaft only when power is applied to the motor.

While we have described above the principles of our invention in connection with specific apparatus, it is to be clearly understood that this description is made only by way of example and not as a limitation to the scope of our invention as set forth in the objects thereof and in the accompanying claims.

We claim:

1. A device for determining the median value of a varying signal comprising a source of reference voltage, comparison means responsive to a voltage varying in accordance with said signal and said reference voltage to produce a control voltage indicative of the sense of the amplitude difference between said varying voltage and said reference voltage, and means having a large time constant responsive to said control voltage to reduce the magnitude of the difference between said reference voltage and said varying voltage to obtain the median value of said signal.

2. A device for determining the median value of a varying signal comprising a source of reference voltage, comparison means responsive to a voltage varying in accordance with said signal and said reference voltage to produce a control voltage indicative of the sense of the amplitude difference between said varying voltage and said reference voltage, and means having a large time constant responsive to said control voltage to adjust the amplitude of said reference voltage relative to the amplitude of said varying voltage to render said reference voltage and said varying voltage substantially equal in amplitude to obtain the median value of said signal.

3. A device for determining the median value of a varying signal comprising a source of reference voltage, comparison means responsive to a voltage varying in accordance with said signal and said reference voltage to produce a control voltage indicative of the sense of the amplitude difference between said varying voltage and said reference voltage, and means having a large time constant responsive to said control voltage to adjust the amplitude of said varying voltage relative to the amplitude of said reference voltage to render said varying voltage and said reference voltage substantially equal in amplitude to obtain the median value of said signal.

4. A device for determining the median value of a varying signal comprising a source of reference voltage including a potentiometer to adjust the amplitude of said reference voltage, a comparison means responsive to a voltage varying in accordance with said signal and said reference voltage to produce a control voltage indicative of the sense of the amplitude difference between said varying voltage and said reference voltage, and means including a constant, slow speed, reversible motor coupled to said potentiometer responsive to said control voltage to adjust the amplitude of said reference voltage to reduce the magnitude of the difference between said reference voltage and said varying voltage to obtain the median value of said signal.

5. A device for determining the median value of a varying signal comprising a source of electric energy and a potentiometer coupled in shunt relation to said source of electric energy to establish a reference voltage on the adjustable contact thereof, comparison means responsive to a voltage varying in accordance with said signal and said reference voltage to produce a control voltage indicative of the sense of the amplitude difference between said varying voltage and said reference voltage, and a constant, slow speed, reversible motor coupled to said potentiometer responsive to said control voltage to change the position of said adjustable contact to adjust the amplitude of said reference voltage to render said reference voltage and said varying voltage substantially equal in amplitude to obtain the median value of said signal.

6. A device for determining the median value of a varying signal comprising a potentiometer responsive to said signal to provide an adjustable voltage varying in accordance with said signal, a source of reference voltage, comparison means responsive to said varying voltage and said reference voltage to produce a control voltage indicative of the sense of the amplitude difference between said varying voltage and said reference voltage, and a constant, slow speed, reversible motor coupled to said potentiometer responsive to said control voltage to adjust the amplitude of said varying signal to render said varying voltage substantially equal in amplitude to said reference voltage to obtain the median value of said signal.

7. A device for determining the median value of a varying signal comprising a source of direct current voltage to establish a reference voltage, a difference amplifier responsive to a voltage varying in accordance with said signal and said reference voltage to provide either of two output currents to indicate whether said varying voltage is above or below said reference voltage, a relay coupled to the output of said amplifier responto said output currents to activate one of two circuits, and integrating means responsive to said activated one of said circuits to render said reference voltage and said varying voltage substantially equal in amplitude to obtain the median value of said input signal.

8. A device for determining the median value of a varying signal comprising a source of direct current electric energy and a potentiometer coupled in shunt relation to said source of electric energy to establish a reference voltage on the adjustable contact thereof, a difference amplifier responsive to a voltage varying in accordance with said signal and said reference voltage to provide either of two output currents to indicate whether said varying voltage is above or below said reference voltage, a relay coupled to the output of said amplifier responsive to said output current to activate one of two circuits, and a constant, slow speed, reversible motor coupled to said two circuits having its direction of rotation controlled by said activated one of said two circuits to change the position of said adjustable contact to adjust the amplitude of said reference voltage to render said reference voltage and said varying voltage substantially equal in amplitude to obtain the median value of said signal.

9. A device for determining the median value of a varying signal comprising a potentiometer responsive to said signal to provide an adjustable voltage varying in accordance with said signal, a source of direct current voltage to establish a reference voltage, a difference amplifier responsive to said varying voltage and said reference voltage to provide either of two output currents to indicate whether said varying voltage is above or below said reference voltage, a relay coupled to the output of said amplifier responsive to said output current to activate one of two circuits, and a constant, slow speed, reversible motor coupled to said two circuits having its direction of rotation controlled by said activated one of said two circuits to change the position of the sliding contact of said potentiometer to adjust the amplitude of said varying voltage to render said reference voltage and said varying voltage substantially equal in amplitude to obtain the median value of said signal.

10. A device for recording the median value of a varying signal comprising a source of reference voltage, comparison means responsive to a voltage varying in accordance with said signal and said reference voltage to produce a control voltage indicative of the sense of the amplitude difference between said varying voltage and said reference voltage, integrating means responsive to said control voltage to reduce the magnitude of the difference between said reference voltage and said varying voltage to obtain the median value of said signal, and means responsive to said control voltage responsive means to record said median value.

11. A device for recording the median value of a varying signal comprising a source of reference voltage, comparison means responsive to a voltage varying in accordance with said signal and said reference voltage to produce a control voltage indicative of the sense of the amplitude difference between said varying voltage and said reference voltage, integrating means responsive to said control voltage to adjust the amplitude of said varying voltage relative to the amplitude of said reference voltage to render said varying voltage and said reference voltage substantially equal in amplitude to obtain the median value of said signal, and means responsive to said control voltage responsive means to record said median value.

12. A device for recording the median value of a varying signal comprising a source of reference voltage, comparison means responsive to a voltage varying in accordance with said signal and said reference voltage to produce a control voltage indicative of the sense of the amplitude difference between said varying voltage and said reference voltage, integrating means responsive to said control voltage to adjust the amplitude of said reference voltage relative to the amplitude of said varying voltage to render said varying voltage and said reference voltage substantially equal in amplitude to obtain the median value of said signal, and means responsive to said control voltage responsive means to record said median value.

13. A device for recording the median value of a varying signal comprising a source of electric energy and a potentiometer coupled in shunt relation to said source of electric energy to establish a reference voltage on the adjustable contact thereof, comparison means responsive to a voltage varying in accordance with said signal and said reference voltage to produce a control voltage indicative of the sense of the amplitude difference between said varying voltage and said reference voltage, a constant, slow speed, reversible motor coupled to said potentiometer responsive to said control voltage to change the position of said adjustable contact to adjust the amplitude of said reference voltage to render said reference voltage and said varying voltage substantially equal in amplitude to obtain the median value of said signal, a recorder including a recording pen, and means coupling said pen to said motor to record said median value.

14. A device for recording the median value of a varying signal comprising a potentiometer responsive to said signal to provide an adjustable voltage varying in accordance with said signal, a source of reference voltage, comparison means responsive to said varying voltage and said reference voltage to produce a control voltage indicative of the sense of the amplitude difference between said varying voltage and said reference voltage, a constant, slow speed, reversible motor coupled to said potentiometer responsive to said control voltage to adjust the amplitude of said varying signal to render said varying voltage substantially equal in amplitude to said reference voltage to obtain the median value of said signal, a recorder including a recording pen, and means coupling said pen to said motor to record said median value.

15. A device for recording the median value of a varying signal comprising a source of electric energy and a potentiometer coupled in shunt relation to said source of electric energy to establish a reference voltage on the adjustable contact thereof, a difference amplifier responsive to a voltage varying in accordance with said signal and said reference voltage to provide either of two output currents to indicate whether said varying voltage is above or below said reference voltage, a relay coupled to the output of said amplifier responsive to said output current to activate one of two circuits, a constant, slow speed, reversible motor coupled to said two circuits having its direction of rotation controlled by said activated one of said two circuits to change the position of said adjustable contact to adjust the amplitude of said reference voltage to render said reference voltage and said varying voltage substantially equal in amplitude to obtain the median value of said signal, a recorder including a recording pen, and means coupling said pen to said motor to record said median value.

16. A device for recording the median value of varying signal comprising a potentiometer responsive to said signal to provide an adjustable voltage varying in accordance with said signal, a source of reference voltage, a difference amplifier responsive to said varying voltage and said reference voltage to provide either of two output currents to indicate whether said varying voltage is above or below said reference voltage, a relay coupled to the output of said amplifier responsive to said output current to activate one of two circuits, a constant, slow speed, reversible motor coupled to said two circuits having its direction of rotation controlled by said activated one of said two circuits to change the position of the sliding contact of said potentiometer to adjust the amplitude of said varying voltage to render said reference voltage and said varying voltage substantially equal in amplitude to obtain the median value of said signal, a recorder including a recording pen, and means coupling said pen to said motor to record said median value.

17. A system for determining the median value of a continuously varying signal comprising a source of reference voltage, a source of voltage varying in accordance with said signal, means to adjust the amplitude of said reference voltage and said varying voltage relative to each other to select an arbitrary median value for said signal, integration means coupled to said reference voltage and said varying voltage to integrate the times said varying voltage is above and below said arbitrary median value, and means coupled to said integration means for automatically correcting said arbitrary median value to obtain the true median value of said signal.

18. A device for determining the median value of a varying signal comprising a source of voltage varying in accordance with said signal, a source of reference voltage, comparison means responsive to said varying voltage and said reference voltage to produce a control voltage indicative of the sense of the amplitude difference between said varying voltage and said reference voltage, and a constant, slow speed, reversible motor coupled to a given one of said sources responsive to said control voltage to reduce the amplitude difference between said reference voltage and said varying voltage to obtain the median value of said signal.

References Cited in the file of this patent

UNITED STATES PATENTS

| | | |
|---|---|---|
| 1,822,075 | Aronoff | Sept. 8, 1931 |
| 2,162,469 | Harrison | June 13, 1939 |
| 2,358,243 | Moore | Sept. 12, 1944 |
| 2,438,583 | Steghart et al. | Mar. 30, 1948 |
| 2,517,330 | Marenholtz | Aug. 1, 1950 |
| 2,656,498 | Goodwin | Oct. 20, 1953 |
| 2,672,598 | Hornfeck et al. | Mar. 16, 1954 |
| 2,720,626 | Wing | Oct. 11, 1955 |